United States Patent [19]
Barnett et al.

[11] Patent Number: 6,004,696
[45] Date of Patent: Dec. 21, 1999

[54] AG-PEROVSKITE CERMETS FOR THIN FILM SOLID OXIDE FUEL CELL AIR-ELECTRODE APPLICATIONS

[75] Inventors: Scott Alexander Barnett, Evanston, Ill.; Li-Shun Wang, Santa Rosa, Calif.

[73] Assignee: Northwestern University, Evanston, Ill.

[21] Appl. No.: 08/408,953

[22] Filed: Mar. 22, 1995

[51] Int. Cl.$^6$ ................................................. A01M 8/12
[52] U.S. Cl. ........................... 429/219; 429/33; 429/40; 429/44; 423/594; 423/599
[58] Field of Search ............................. 429/219, 30, 33, 429/40, 44; 423/263, 594, 599; 502/347, 324, 325

[56] References Cited

U.S. PATENT DOCUMENTS

| | | | |
|---|---|---|---|
| 4,110,260 | 8/1978 | Yamamoto et al. | 252/519 |
| 4,702,971 | 10/1987 | Isenberg | 429/33 |
| 4,789,561 | 12/1988 | Schäefer et al. | 429/33 |
| 5,244,753 | 9/1993 | Taniguchi et al. | |
| 5,273,628 | 12/1993 | Liu et al. | 204/59 R |
| 5,308,712 | 5/1994 | Seiki et al. | |
| 5,314,508 | 5/1994 | Taniguchi et al. | |
| 5,342,703 | 8/1994 | Kawasaki et al. | |
| 5,395,704 | 3/1995 | Barnett et al. | 429/30 |
| 5,413,691 | 5/1995 | Kaneyasa et al. | 204/424 |

OTHER PUBLICATIONS

Wang and Barnett, "Deposition, Structure, and Properties of Cermet Thin Films Composed of Ag and Y–Stabilized Zirconia", J. Electrochem. Soc., 139(4) Apr. 1992, 1134.

E.S. Thiele, L.S.Wang, T.O.Mason, S.A.Barnett, Deposition and properties of yttria–stabilized zirconia thin films using reactive direct current magnetron sputtering, J.Vac.Sci.Technol. A9(6), Nov./Dec. 1991, pp. 3054–3060.

A.Tsunoda, T.Yoshida & S.Sakurada, Effect of Pt Additions on the Resistance of $La_{0.9}Sr_{0.1}MnO_3$ Cathode, Proc. First Int.Symp.Solid Oxide Fuel Cells, ed. S.C.Singhal (Electrochem. Soc., Pennington, 1989) pp. 204–213 (no month available).

L.S.Wang & S.A.Barnett, Sputter–deposited medium–temperature solid oxide fuel cells with multi–layer electrolytes, Solid State Ionics 61 (1993) 273–276 (no month).

N.Q.Minh, T.R.Armstrong, J.R.Esposa, J.V.Guiheen. C.R.Horne & J.J. vanAckeren, Tape–calendared monolithic and flat plate solid oxide fuel cells, Third Int.Symp.Solid Oxide Fuel Cells, eds. S.C.Singhal & H.Iwahara (Electrochem.Soc., Pennington, 1993) pp. 801–808 (no month).

S.A.Barnett, A new solid oxide fuel cell design based on thin film electrolytes, Energy, vol. 15 (1980), pp. 1–9 (no month).

K.Krist & J.D.Wright, Fabrication Methods for Reduced Temperature Solid Oxide Fuel Cells, Proc.Third Int.Symp-.Solid Oxide Fuel Cells, eds. S.C.Singhal & H.Iwahara (Electrochem. Soc., Pennington, (1993) pp. 782–791 (no month).

L.S.Wang & S.A.Barnett, Lowering the Air–electrode Interfacial Resistance in Medium–temperature Solid Oxide Fuel Cells, J.Electrochem.Soc., vol. 139 No. 10, Oct. 1992, pp. 89–91.

L.S.Wang & S.A.Barnett, Deposition, Structure and Properties of Cermet Thin Films Comprised of Ag & Y–stbilized Zirconia, J.Electrochem.Soc. vol. 139 No.4, Apr. 1992, pp. 1134–1140.

*Primary Examiner*—Stephen Kalafut
*Assistant Examiner*—Carol Chaney
*Attorney, Agent, or Firm*—Flehr, Hohbach, Test, Albritton & Herbert

[57] ABSTRACT

An air electrode for a solid oxide fuel cell having high conductivity and low interfacial resistance is disclosed. Said air electrode is composed of an Ag-perovskite cermet.

18 Claims, 12 Drawing Sheets

AG-PEROVSKITE CERMETS FOR THIN FILM SOLID OXIDE FUEL CELL AIR-ELECTRODE APPLICATIONS

BRIEF DESCRIPTION OF THE INVENTION

This invention relates generally to thin film solid oxide fuel cells (SOFC's) and more particularly to the Ag-perovskite cermet air electrodes in SOFC's.

BACKGROUND OF THE INVENTION

Solid oxide fuel cells generally comprise a solid electrolyte such as yttria stabilized zirconia (YSZ) with a positive air electrode on one surface of the electrolyte and a negative fuel electrode such as a cermet of nickel and stabilized zirconia on the other surface of the electrolyte.

Results on solid oxide fuel cells (SOFC's) employing thin (~10 $\mu$m) Y-stabilized zirconia (YSZ) electrolytes [1,2] have recently been reported. One of the main advantages of these thin-film-electrolyte cells is that electrolyte ohmic resistance is small even at reduced (600–800° C.) operating temperatures $T_c$ [3]. Reduced SOFC temperatures should ease materials and processing problems associated with interconnection and gas sealing in SOFC stacks [4]. However, as $T_c$ is lowered below the typical value of ≈1000° C., the rates of thermally-activated electrochemical reactions decrease, increasing electrode interfacial resistance $r_i$ and limiting the SOFC current density. In addition, the resistivity $\rho$ of perovskite air electrode materials increases with decreasing temperature.

Two general approaches have been used to reduce $r_i$. First, the electrode and/or electrolyte compositions can be changed to provide improved catalytic performance. For example, (La,Sr)CoO$_3$ (LSC) air electrodes on YSZ have been shown to provide improved performance over (La,Sr)MnO$_3$ (LSM). The addition of a thin interfacial layer of a second electrolyte, such as Y-doped Bi$_2$O$_3$ (YSB), can also lower $r_i$[5]. Second, standard electrode-electrolyte combinations can be processed so as to maximize he three-phase boundary length. Electrochemical vapor deposition has been used to deposit YSZ within porous LSM electrodes to increase the contact area. Another means for increasing the contact area is via the use of a cermet electrode, e.g. Pt-YSZ or Ag-YSZ, where the additional contact area is within the cermet.

Cermet electrodes can also provide lower resistivity than ceramic air electrodes, especially at low temperatures. For Ag-YSZ cermets[6], for example, $\rho$ values were ≈30 times lower than those of LSC and LSM at 750° C. There has been relatively little work done on cermets that contain noble metals and perovskite oxides, with only one preliminary report on Pt-LSM [7] for typical $T_c$ values of ≈1000° C. We have observed that for SOFC's with Tc<800° C. Ag is an excellent candidate for cermets using perovskite oxide because of its good catalytic activity, high electrical conductivity, and relatively low cost.

OBJECTS AND SUMMARY OF THE INVENTION

It is an object of this invention to provide an inexpensive air electrode for SOFC's which has good catalytic activity and high electrical conductivity.

It is another object of the invention to provide thin film Ag-perovskite cermets for use as positive air electrodes in SOFC's.

Pursuant to the invention there is provided a sputtered Ag-perovskite thin film air electrode for SOFC's.

BRIEF DESCRIPTION OF THE DRAWINGS

The file of this patent contains at least one drawing executed in color.

The foregoing and other objects of the invention will be more clearly understood from the following description, when read in conjunction with the accompanying drawings, wherein.

DESCRIPTION OF THE PREFERRED EMBODIMENT

Figure 1:
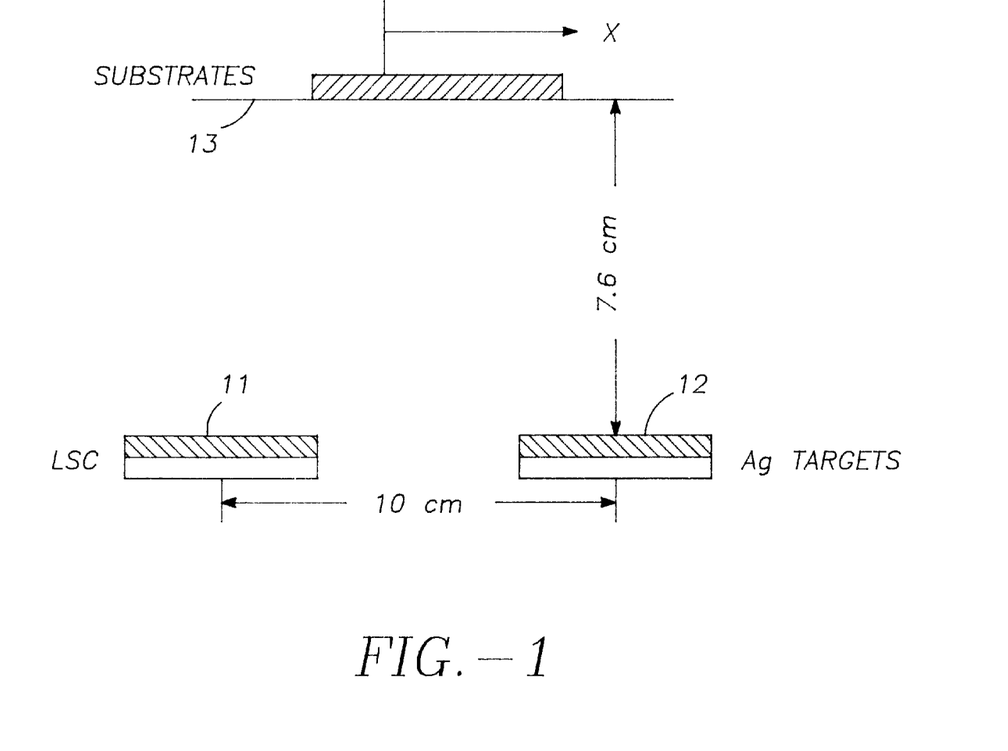
FIG. 1 shows a schematic drawing of the dual-target sputtering geometry used for cermet deposition.

Cermet electrode films in accordance with this invention were deposited by dc magnetron sputtering in a cylindrical, 35 cm diameter, glass bell jar vacuum chamber that was described in more detail elsewhere [8]. The chamber was turbomolecular pumped and reached a base pressure of <3×10$^{-6}$ Torr when the liquid-nitrogen trap was filled. Two spaced planar magnetron sputter sources 11, 12 FIG. 1 were used, one with a 99.95% pure, 5-cm-diameter Ag target and the other with the LSC (or LSM) target. The substrate plane 13 was parallel to the target surface plane, at a distance of 7.6 cm. The distance between the target centers was 10 cm. Substrates were placed along a line above the centers of the sputtering targets, allowing a wide range of cermet compositions to be deposited in a single deposition, while the cermet compositions were constant to within 5% over the 1 cm sample size.

(La$_{0.7}$Sr$_{0.3}$)CoO$_3$ and (La$_{0.7}$Sr$_{0.3}$)MnO$_3$ perovskite targets were synthesized by standard ceramic processing or purchased from SSC, Inc. In the former case, starting powder materials were $La_2O_3$ (99.99%), $SrCO_3$ (99.9%) and $Co_3O_4$ (99.5%). The powders were weighed in the desired ratio, dissolved in acetone solution and mixed for about 1 h. Finally, the mixed powders were cold-pressed at 100 MPa and sintered at 1150° C. in air for 30h into discs 5 cm diameter and ≈3 mm in thickness. The formation of the perovskite structure was confirmed by means of x-ray diffraction (XRD) analysis. Energy dispersive x-ray analysis (EDX) showed the LSC and LSM targets to have the desired metal compositions, i.e. 30 mol % Sr on the A site and stoichiometry between the A and B sites. The commercial perovskite powders were cold pressed at 25 MPa and sintered in air at 1150° C. for 10 h. No difference was observed in the results for the two different methods of target preparation.

Films were deposited onto silica glass substrates except in cases where high temperature ($\geq 600°$ C.) experiments were to be carried out, in which case dense alumina or YSB (25 mol % $Y_2O_3$ substrates were used. Alumina and YSB substrates were polished using 1 $\mu$m diamond-embedded paste. The polished substrates were ultrasonically cleaned in 1 $H_3PO_4$:1 $H_2O$ solution to remove surface contamination. Prior to film deposition, both kinds of substrates were successively rinsed in de-ionized water, ultrasonically cleaned in acetone and finally dried with dry nitrogen. The substrates were not intentionally heated, but the substrate temperature rose to ≈70° C. during deposition under typical conditions.

The sputtering gas was 99.999% pure argon. The argon pressure P was 10 mTorr, corresponding to an argon flow rate of 114 ml/min. For the Ag target, the applied voltage was 300 V and the current was 0.05 A, while the LSC (or LSM) target was operated at 200 V and 0.5 A, respectively. Prior to film deposition, the targets were sputter cleaned for 10 mins with a shutter covering the substrates. New perovskite targets were also sputtered for several hours to reach a steady state condition prior to depositing films. While cracks formed in the LSC and LSM targets after the initial sputtering period, the discharge conditions, sputtering rates, and film purity remained unaffected. Table 1 summarizes the sputtering conditions. Some of the sputter-deposited films were annealed in air at 500–600° C. for 10h prior to characterization.

TABLE 1

Ag-LSC-Co-Sputtering Conditions

| Targets | Ag | LSC |
| --- | --- | --- |
| Voltage (V) | 300 | 200 |
| Current (A) | 0.05 | 0.5 |
| Sputter Gas | | Ar(10 mTorr) |
| Substrate Temperature | | 70° C. |
| Deposition Rate | | 0.7–1.6 $\mu$m/h |

The film thicknesses were 0.5–5 $\mu$m, as measured by scanning a profilometer stylus across a step edge created by masking the substrate during deposition. Film chemical compositions were measured using energy dispersive x-ray analysis (EDX). Film stresses were determined by measuring the curvature of the substrate before and after film deposition with a microstylus profilometer with a scan range of 1 cm. Morphology was analyzed using scanning electron microscopy (SEM) with chemical mapping. Crystal structure was determined using x-ray diffraction (XRD) in the θ–2θ geometry with Cu Kα radiation (40 kV–20 mA).

Electrical resistivities were measured using a van der Pauw geometry with gold or silver wires connected to the sample using silver paste. Electrode polarization curves were measured using a potentiostat (EG&G model 273) connected to a personal computer for data storage and analysis.

Figure 2:
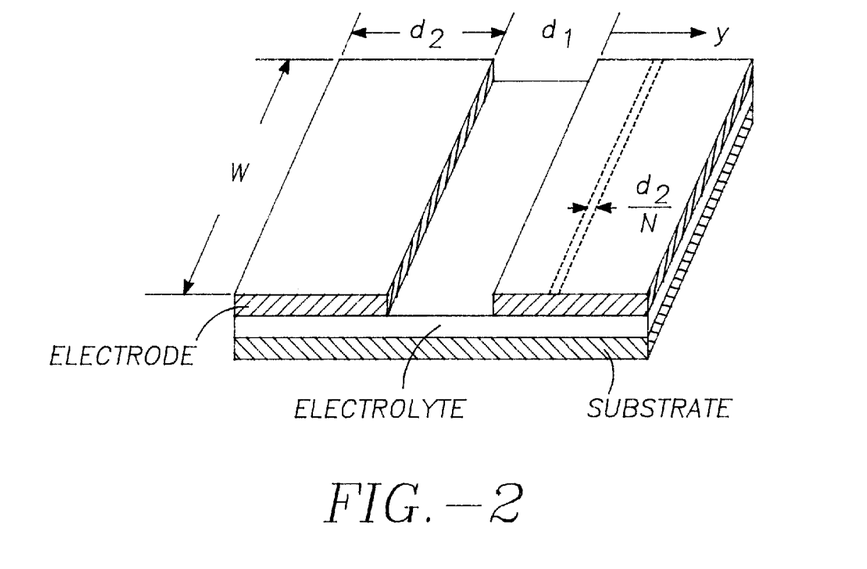
FIG. 2 shows the sample geometry used for interfacial resistance measurements.

Interfacial resistance of Ag-perovskite electrodes on $(Y_2O_3)_{0.25}(Bi_2O_3)_{0.75}$ were studied using a Solartron SI 1260 Frequency Response Analyzer (FRA) over a frequency range 100 kHz to 10 mHz using a ±10 mV excitation signal. Two sample geometries were used. First, the 0.5–1.0 $\mu$m thick electrodes were deposited on both sides of a 2-mm-thick YSB ceramic. The area-specific resistance $r_i=R_eA$, where A is the electrode area and $R_e$ is the measured resistance. Second, measurements were carried out between two electrodes deposited on 3-$\mu$m-thick YSB (25 mol % $Y_2O_3$) electrolyte thin films on dense alumina substrates. The YSB was deposited by reactive co-sputtering from Y and Bi targets in $Ar/O_2$ mixtures at a total pressure of 10 mTorr. The Ag-perovskite cermet electrodes (0.5–1.0 $\mu$m thick) were deposited through a mask that defined two symmetric rectangular regions (FIG. 2) on the YSB film, of width w=0.6–1.0 cm and length $d_2$=2.5 mm, separated by a distance $d_1$=0.4–0.6 mm. Comparisons of the two types of measurements gave excellent agreement.

Figure 3:
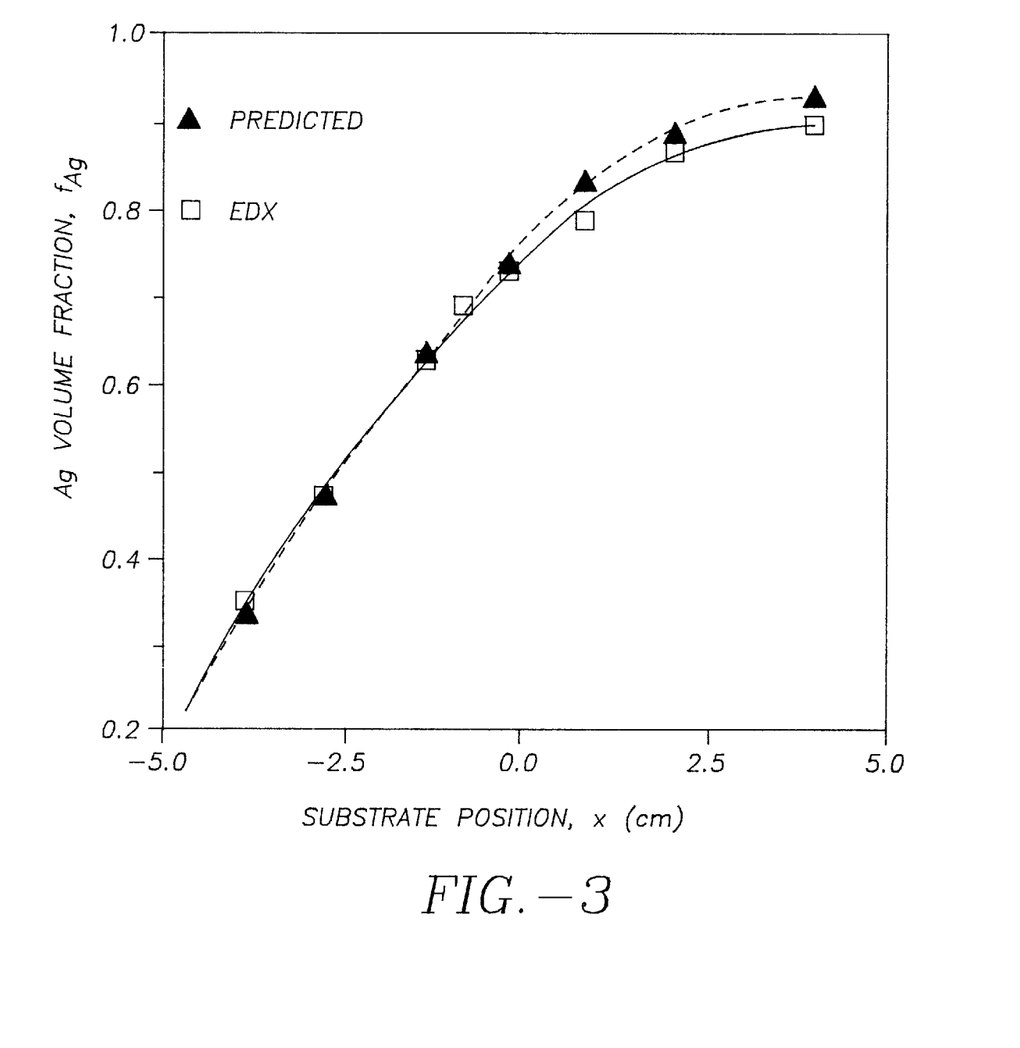
FIG. 3 shows an Ag volume fraction $f_{Ag}$, measured using EDX, as a function of substrate position. Also plotted is the volume fraction predicted using $f_{Ag}=R_{Ag}/R_{Ag+RLSC}$.

The film deposition rate from two targets agreed well with the superposition of the rates from individual targets, as shown previously for Ag-YSZ cermets [6]. The silver volume fraction $f_{Ag}$ as a function of substrate position x (FIG. 1) is shown in FIG. 3. The composition estimated from the superposition of the deposition rates of Ag, $R_{Ag}$, and LSC, $R_{LSC}$, using the expression $f_{Ag}(x)=R_{Ag}(x)(R_{Ag}(x)+R_{LSC}(x))$, is also plotted in FIG. 3. The curves agreed within experimental accuracy, indicating that there was little cross-contamination between the targets. EDX measurements showed that the metal composition of the deposited perovskite phase was stoichiometric within the experimental error (<5%), and was not changed after annealing.

Film densities were estimated by dividing the film mass, given by the mass difference before and after deposition, by the film volume, obtained from the film thickness and area. Because of the errors in these two measurements, the overall accuracy is 10%. For both pure Ag and cermet films with $f_{Ag}$=0.3, the density η relative to the theoretical value $\eta_{th}$ is $\eta/\eta_{th}$≈0.7.

Figure 4:
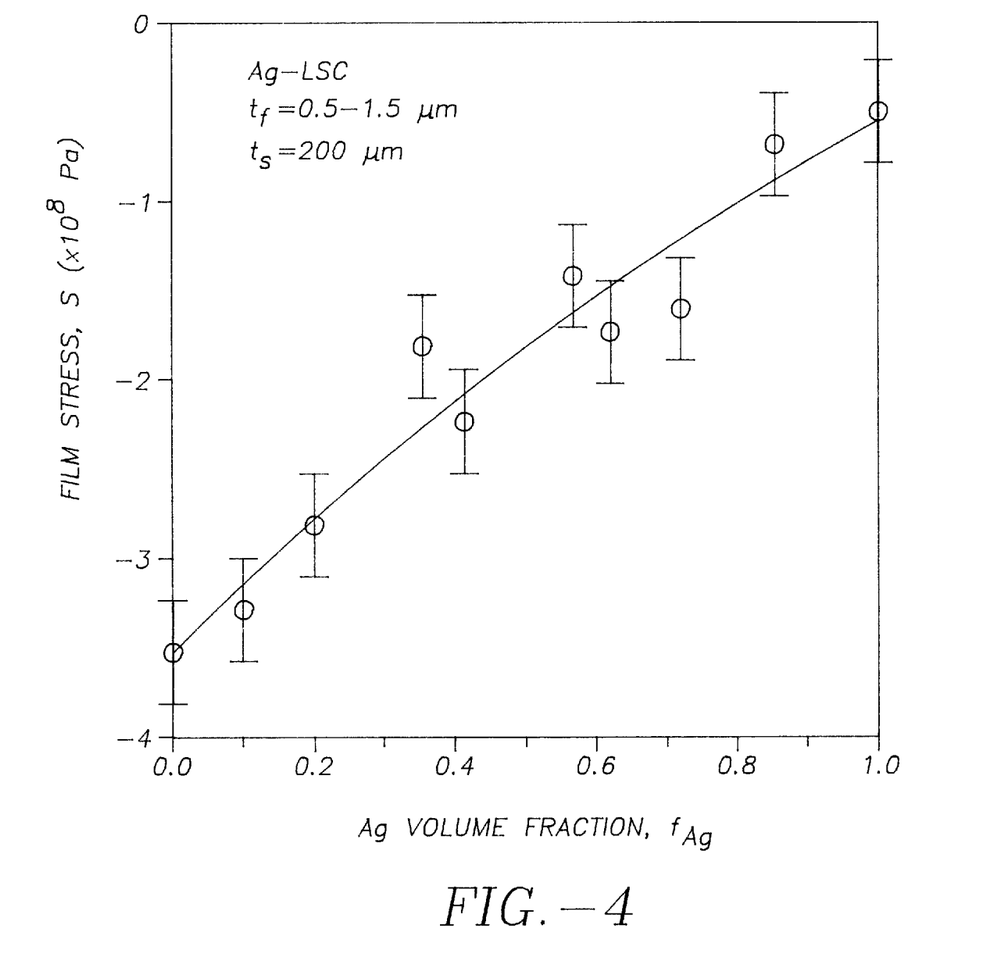
FIG. 4 shows a film stress S as a function of Ag volume fraction in the cermets.
Figure 5A:
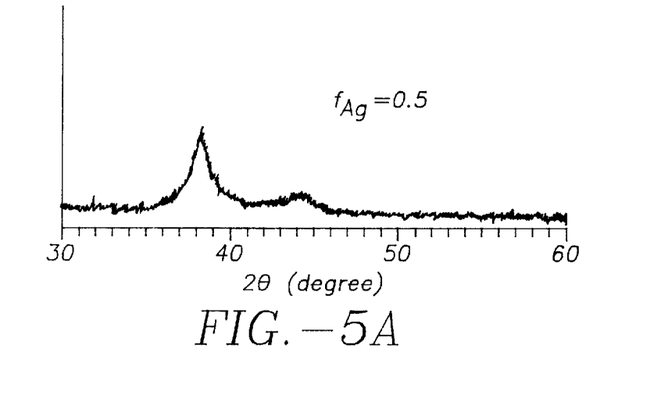
FIGS. 5A–D show X-ray diffractometer scan from (a) an as-deposited $f_{Ag}$=0.5 Ag-LSC cermet, and from (b)$f_{Ag}$=0.5, (c)$f_{Ag}$=0.3, and (d) pure LSC films after annealing at 500–600° C. in air for 10h.
Figure 5B:
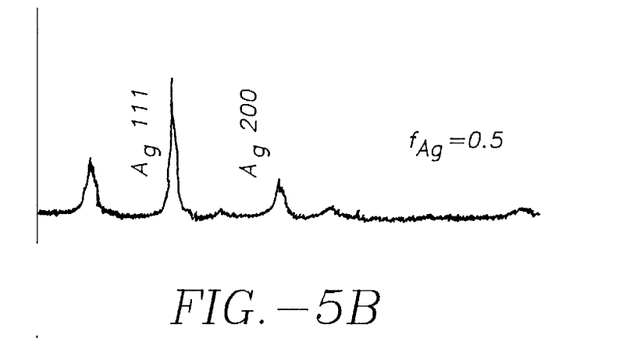
Figure 5C:
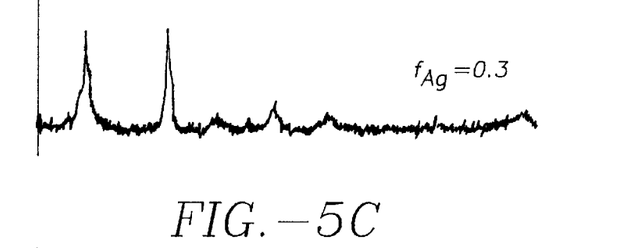
Figure 5D:
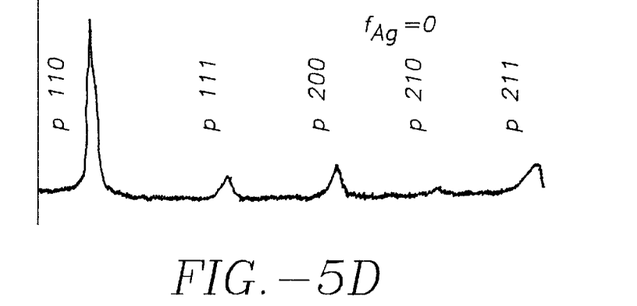

For stress measurements, the films were deposited on 200-$\mu$m-thick glass substrates. The film stress S was related to the deflection δf the substrate, measured between the substrate center and a distance D from the center, by the equation $$S = \frac{Et_s^2}{3(1-v)t_f} \frac{\delta}{D^2} \quad (1)$$

where E it the Young's modulus of the substrate (69 GPa), $t_s$ is the substrate thickness $t_f$ is the film thickness and v is Poisson's ratio for the substrate (0.16). S is plotted as a function of $f_{Ag}$ for Ag-LSC in FIG. 4. The films were in a compressive stress state. S was largest for put LSC, 3.5× $10^8$Pa, and decreased rapidly with increasing $f_{Ag}$ to 0.5× $10^8$Pa for pure Ag. The magnitude and sign of the stress are very similar to previous results for Ag-YSZ cermet films prepared using the same technique [6]. The lower stress in Ag-rich films was likely due to plastic deformation of Ag limiting the film stress to relatively low levels.

FIGS. 5A–D show representative x-ray diffraction (XRD) spectra from both as-deposited and annealed 1-$\mu$m-thick films with different $f_{Ag}$. The as-deposited $f_{Ag}$=0.5 cermet film (a) was partially amorphous as indicated by the lack of perovskite peaks, the weak broadened Ag peak intensities, and relatively large background intensity. The crystallinity of this sample improved after annealing at 500–600° C. for 10h (b) as indicated by the sharper, more-intense Ag peaks and the appearance of LSC peaks. XRD results from $f_{Ag}$=0.3(c) and $f_{Ag}$=0(d) films after annealing are also shown. The relative Ag and perovskite peak intensities correlated well with the film composition.

Figure 6A:
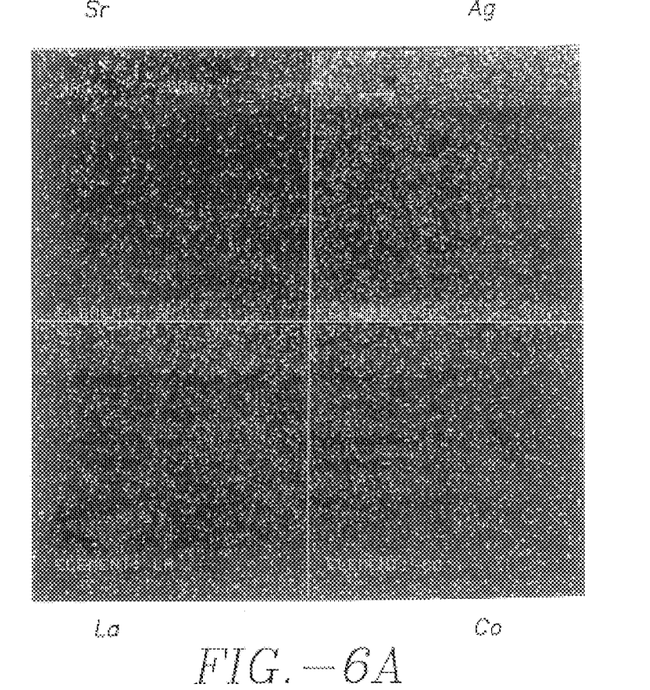
FIGS. 6A and 6B show SEM chemical images from (a) an as-deposited $f_{Ag}$=0.3 cermet film and (b) the same film after annealing at 750° C. in air for 2h.
Figure 6B:
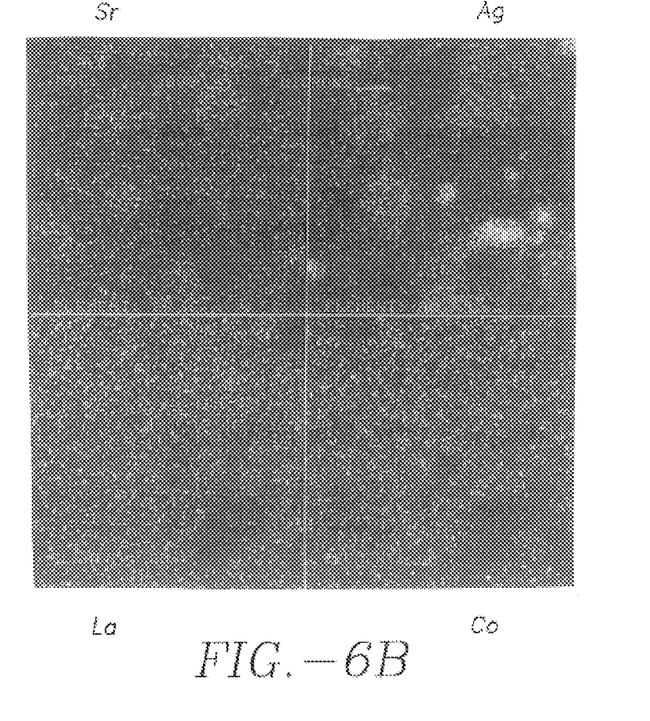

The Ag and perovskite distribution in the cermet films was assessed using SEM chemical imaging. FIG. 6A shows the chemical images of the spatially-resolved La, Sr, Co, and Ag EDX signals in an as-deposited $f_{Ag}$=0.3 Ag-LSC film deposited on an alumina substrate. La, Sr, Co, and Ag were uniformly dispersed, on the scale observed by SEM (≈0.1 μm), in the as-deposited film. FIG. 6B shows the EDX chemical image of the same film after annealing at 750° C. for 2h in air. The only change from the as-deposited film in FIG. 6A was the appearance of isolated Ag clusters. Segregation of the metal out of the cermet structure has also been observed for Ag-YSZ [6] and Ni-YSZ cermets after annealing. The segregation can be suppressed by the use of a pure LSC cap layer, as discussed below.

Figure 7:
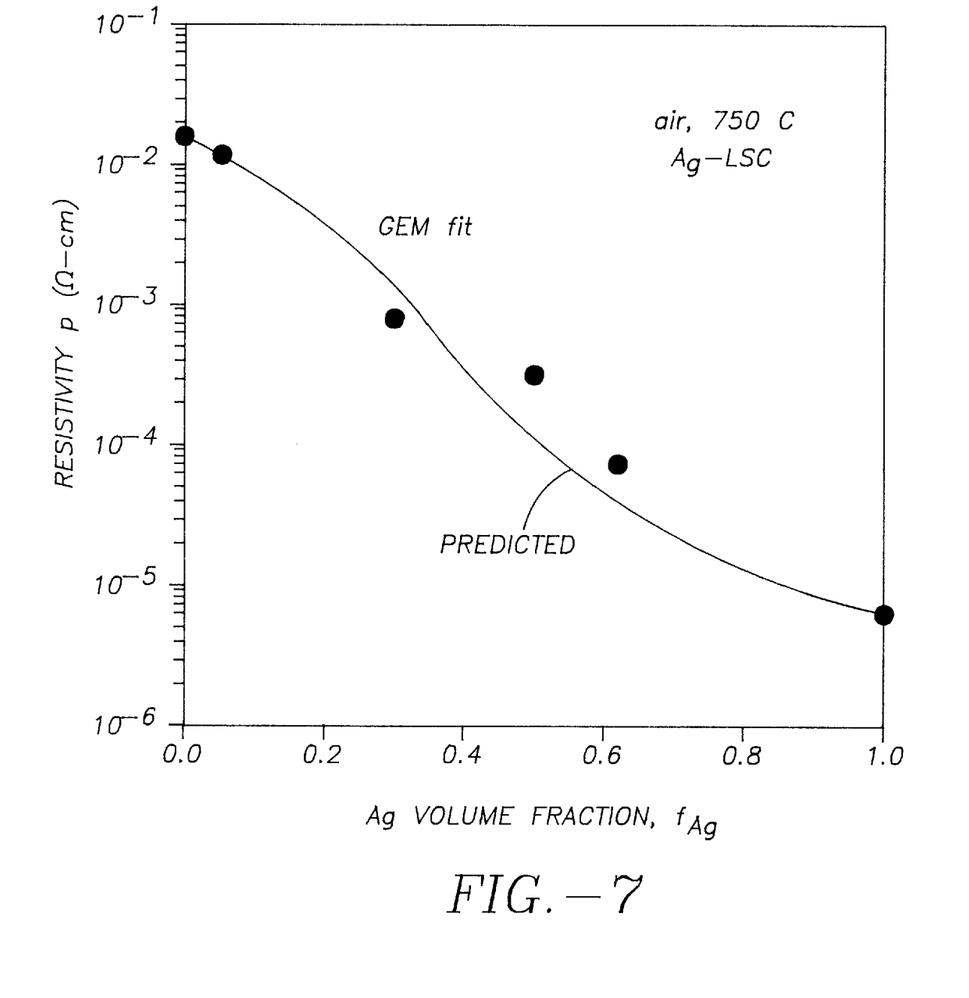
FIG. 7 shows resistivity $\rho$ as a function of $f_{Ag}$ measured at 750° C. Also shown is the resistivity predicted using the GEM fit, eq. [2].
Figure 8:
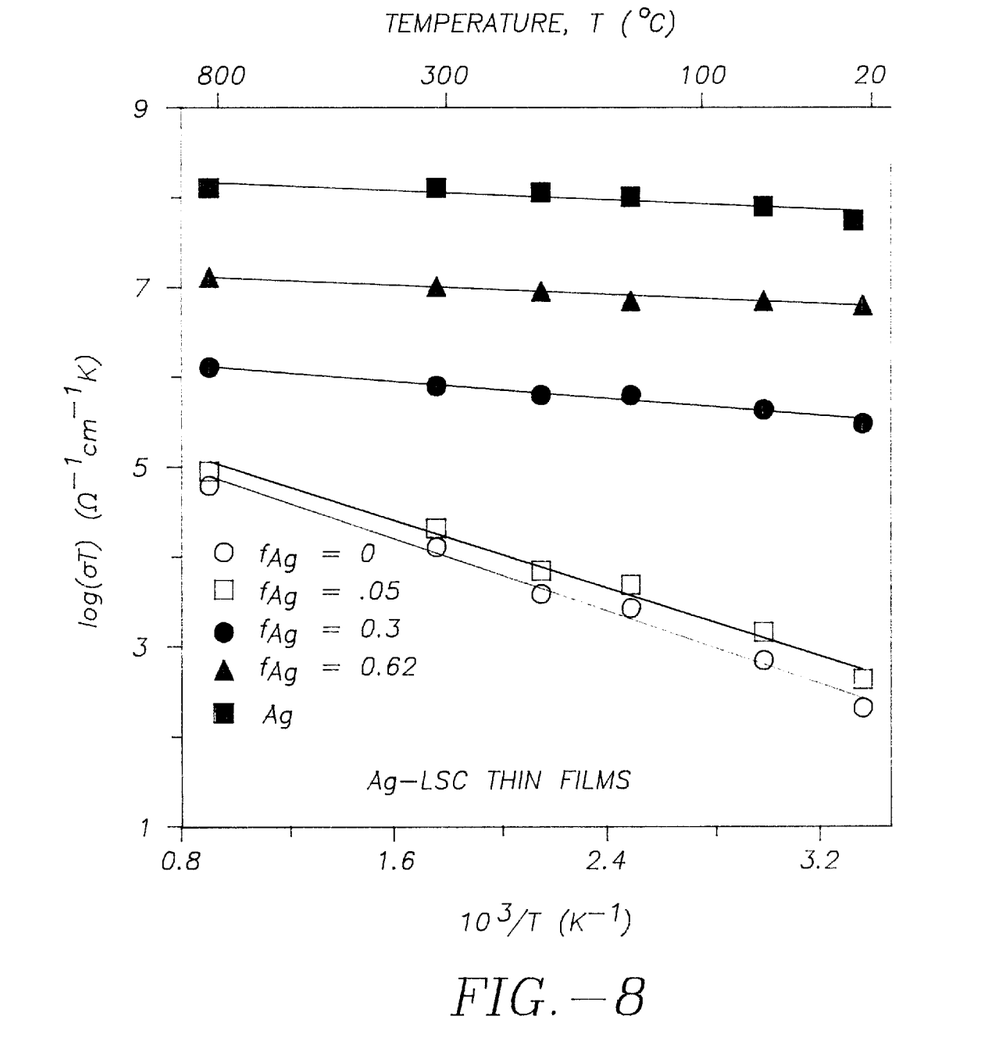
FIG. 8 shows log$\sigma$T plotted as a function of reciprocal temperature for pure LSC (◯), for Ag-LSC films with 0.05 (□), 0.3 (●), and 0.62 (▲), and pure Ag (◇).
Figure 9A:
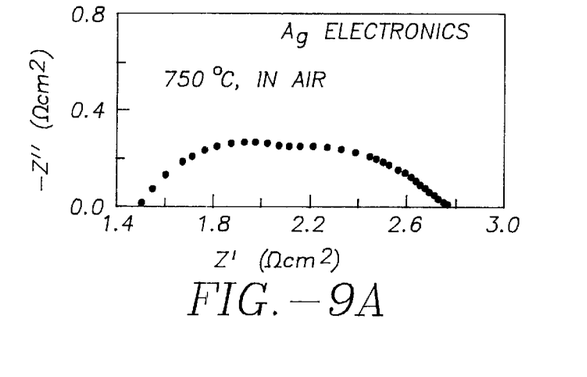
FIGS. 9A–D show complex impedance plots from Ag- and LSC-containing electrodes with different $f_{Ag}$ values on YSB electrolyte, measured in air at 750° C.
Figure 9B:
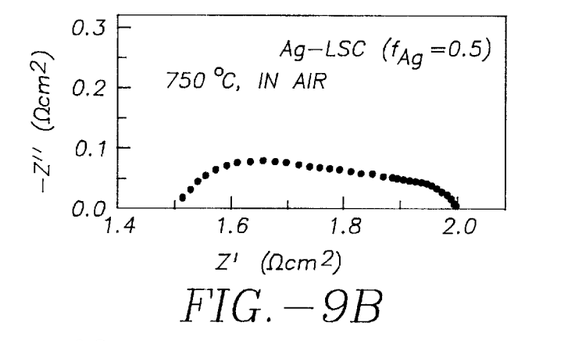
Figure 9C:
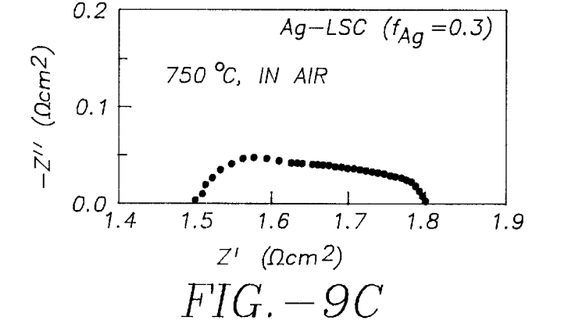
Figure 9D:
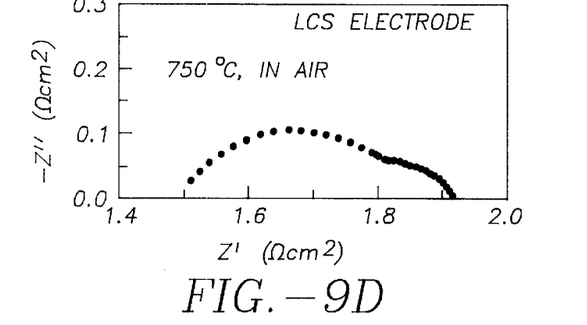

The resistivity ρ of 1-μm-thick Ag-LSC films on alumina substrates versus $f_{Ag}$, measured at temperature T=750° C. in air, is shown in FIG. 7. The films had been annealed at 600° C. in air for 10h prior to measurement, and ρ values were stable during the measurement. ρ decreased with $f_{Ag}$ from $1.6\times10^{-2}$ Ω.cm for a pure perovskite film to $1\times10_{-5}$ Ω.cm for a pure Ag film. The ρ variation with metal volume fraction was much stronger on the perovskite-rich side than that observed for Pt-LSM cermets [7]. However, the present resistivity values are in excellent agreement with the general effective media (GEM) theoretical predictions for cermets where both phases are conducting. The calculated cermet electrical conductivity σ is given by $$\frac{(1-f_{Ag})(\sigma_{LSC}^{1/p} - \sigma^{1/p})}{\sigma_{LSC}^{1/p} + A\sigma^{1/p}} + \frac{f_{Ag}(\sigma_{Ag}^{1/p} - \sigma^{1/p})}{\sigma_{Ag}^{1/p} + A\sigma^{1/p}} = 0 \quad (2)$$

where $\sigma_{Ag}$ and $\sigma_{LSC}$ are the conductivities of the two phases, $A=(1-f_c)/f_c$, $f_c$ is the critical Ag volume fraction for percolation conductivity, and p is a parameter usually in the range from 1.65–2.0. The solid line shown in FIG. 6 was obtained using $f_c$=0.4 and p=2.0, which are both reasonable values. The calculated curve is in good agreement with the data.

σT for annealed films with different Ag-LSC compositions is plotted versus 1000/T in FIG. 8. Straight lines are observed over the whole temperature range, and the slope is consistent with a small-polaron conduction model for the LSC-rich compositions. With increasing Ag content, the slope decreases and eventually reverses, exhibiting the decrease in σ expected for metals with increasing T.

Impedance spectroscopy studies of reactions at Ag-LSC electrodes on YSB were carried out as a function of T, oxygen partial pressure P, and $f_{Ag}$. FIGS. 9A–D show complex impedance plots for different electrode compositions on YSB electrolytes, measured at T=750° C. in air. The bulk arcs were omitted. The $f_{Ag}$=0, 0.3, and 0.5 results showed a superposition of two arcs, indicating that there was more than one important rate-limiting step. The lower-frequency arc became more important with increasing $f_{Ag}$.

Figure 10:
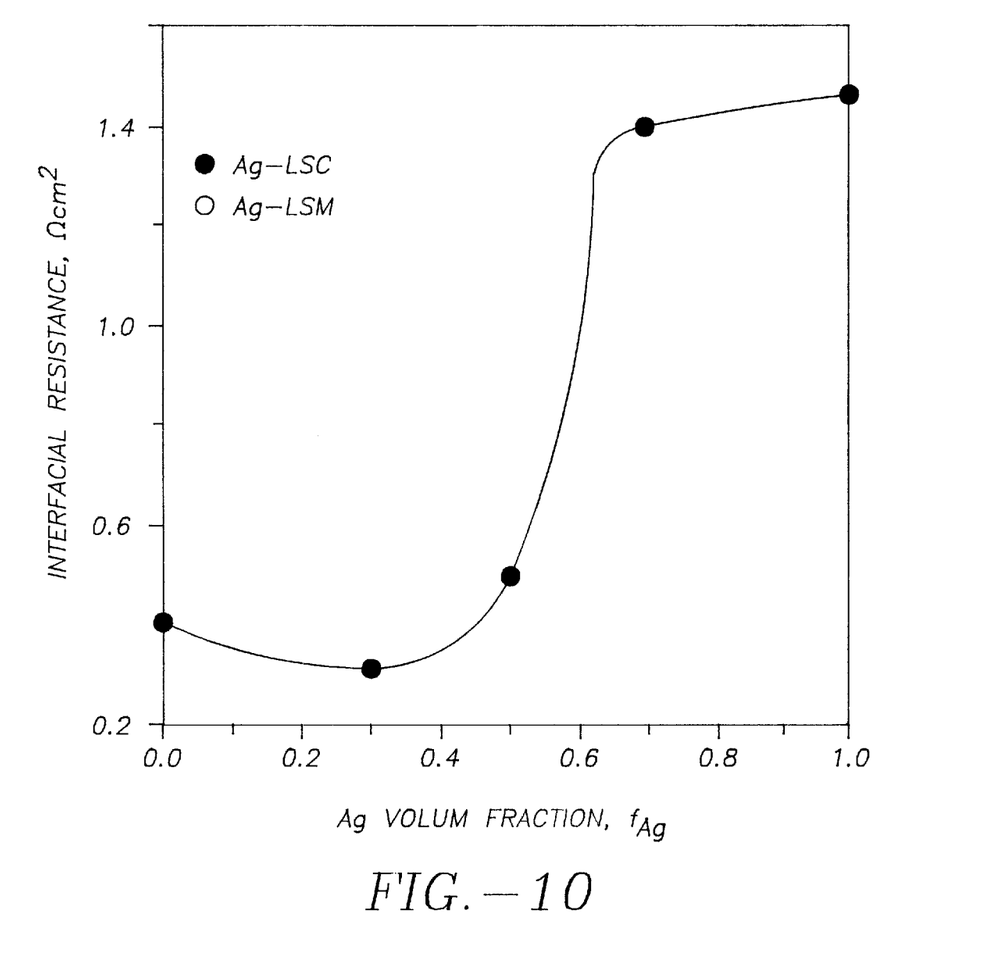
FIG. 10 depicts interfacial resistance versus $f_{Ag}$ of Ag-LSC and Ag-LSM electrodes with different $f_{Ag}$ values on YSB electrolytes, measured in air at 750° C.

The electrode interfacial resistance $r_1$, determined from the real-axis intercepts of the arcs as shown in FIGS. 9A–D, are plotted versus $f_{Ag}$ for both Ag-LSC ad Ag-LSM in FIG. 10. For Ag-LSC $r_i$ first decreased with increasing $f_{Ag}$, reached a minimum near $f_{Ag}$=0.3, and then increased rapidly to the value characteristic of pure Ag. The shape of the impedance arcs for Ag-LSM was similar to those shown for Ag-LSC. The $r_i$ value for pure LSM was almost a factor of two higher than that for pure LSC. Adding Ag to LSM decreased $r_i$ substantially, as shown for $f_{Ag}$=0.3 in FIG. 10.

Figure 11:
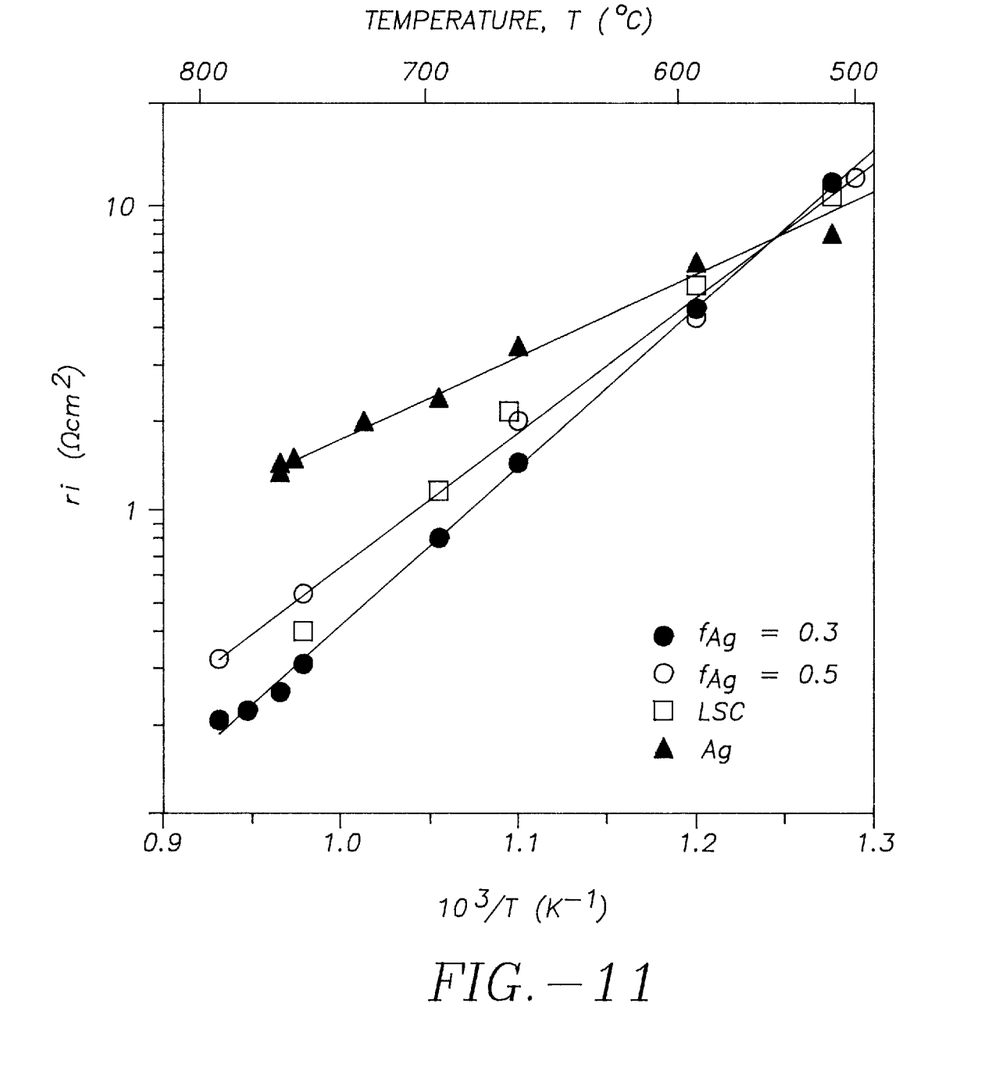
FIG. 11 depicts interfacial resistance $r_i$ versus inverse temperature for various Ag- and LSC-containing electrodes on YSB electrodes.
Figure 12A:
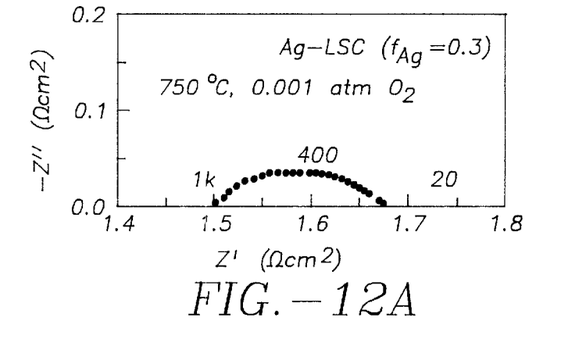
FIGS. 12A–D depict complex impedance plots from $f_{Ag}$=0.3 Ag-LSC electrodes on YSB electrolytes, measured at 750° C. for various oxygen partial pressures.
Figure 12B:
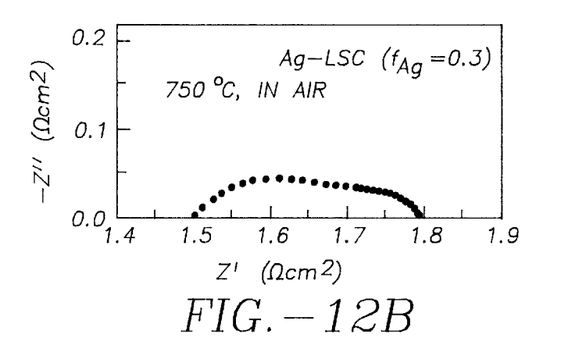
Figure 12C:
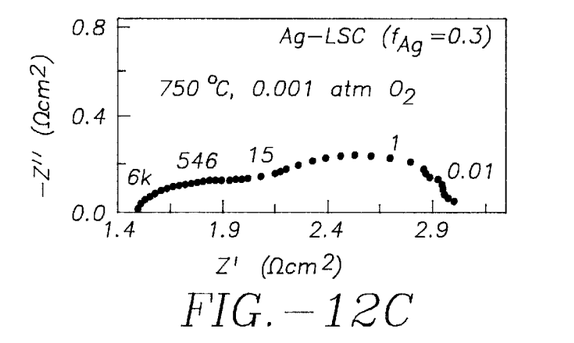
Figure 12D:
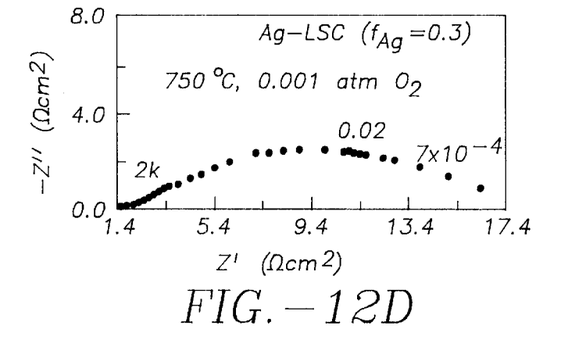

FIG. 11 gives $r_i$ as a function of 1/T for Ag, LSC, and cermet electrodes with $f_{Ag}$=0.3 and 0.5. The $f_{Ag}$=0.3 composition showed the lowest interfacial resistance for T>550° C., while pure Ag had the lowest $r_i$ for T<550° C. The slope of log$r_i$ versus 1/T was largest for $f_{Ag}$=0.3 (the corresponding activation energy was 105 kJ/mol), and was sightly smaller for both pure Ag, corresponding to 58 kJ/mol. The similar slopes for LSC and $f_{Ag}$=0.3 and 0.5 electrodes suggests that the rate-limiting steps were the same, although the $f_{Ag}$=0.3 cermet exhibited a lower absolute $r_i$ rate.

Figure 13:
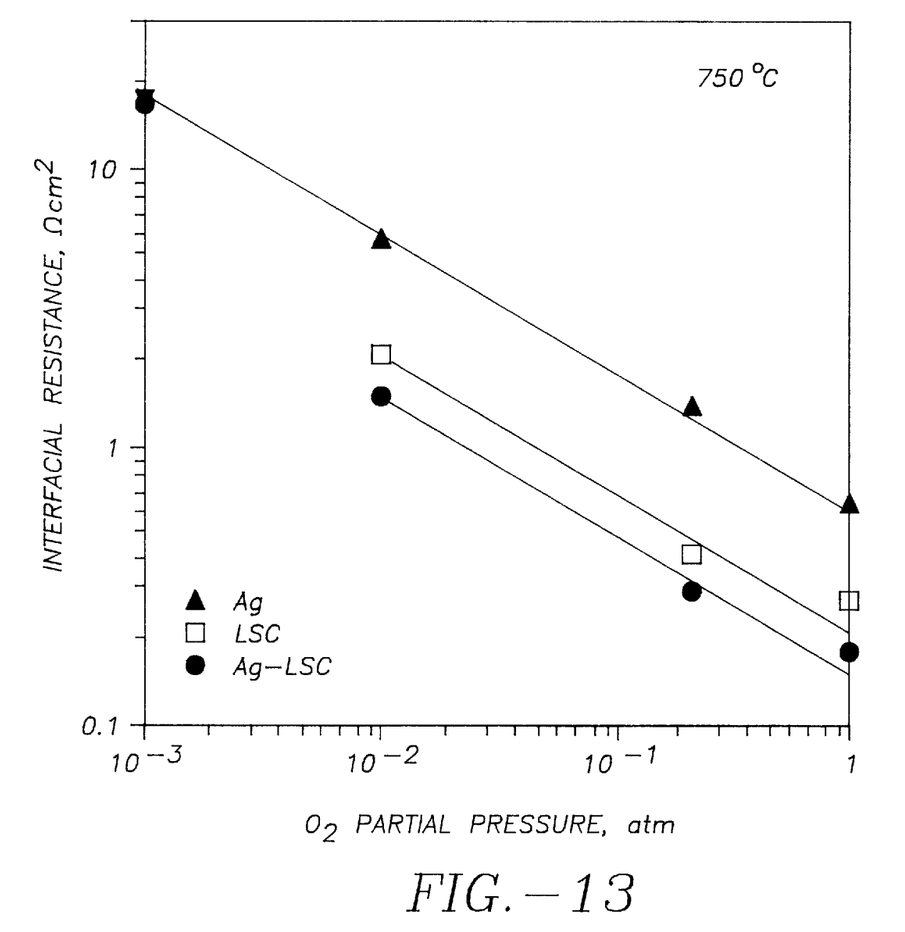
FIG. 13 depicts oxygen-pressure dependence of the interfacial resistance $r_i$ for various Ag- and LSC-containing electrodes on YSB. The lines have a slope given by $r_i \alpha P^{-0.5}$.

FIGS. 12A–D show the low-frequency impedance diagrams as a function of P for the $f_{Ag}$=0.3 cermet. Two overlapping electrode arcs were observed in each case, with the lower-frequency arc dominating at low P and the higher-frequency arc dominating at high P. FIG. 13 shows $r_i$ versus P for Ag, LSC, and $f_{Ag}$=0.3 electrodes obtained from data such as shown in FIGS. 12A–D. The Ag electrode exhibited a $r_i \propto P^{-0.5}$ dependence, indicative of mass transport as the rate-limiting step. Both the LSC and cermet electrodes exhibited a $P^{-0.5}$ power law at intermediate P, but showed indications of a larger exponent at lower P and a smaller exponent at higher P. For electrode operation in air, the primary rate-limiting process was thus mass transport, although there were indications that charge transfer played a role. The P-dependencies for the LSC and $f_{Ag}$=0.3 electrodes were essentially the same, indicating similar reaction mechanisms in agreement with the temperature-dependent studies above.

The overpotential η of the $f_{Ag}$=0.3 electrode on YSB was measured with a potentiostat at T=750° C. in air. The low current resistance was very close to the value $r_i$=0.3 Ωcm² measured by impedance spectroscopy, but increased slightly with increasing current density to yield η≈35 mV at 100 mA/cm².

To summarize the above results for T=750° C. in air, the electrode resistances were limited primarily by mass transport, although charge transfer apparently became more important for the LSC-rich compositions. Two possible explanations can be proposed for the decrease in $r_i$ as Ag is added to LSC, as shown in FIG. 10. First, the combination of two materials with different rate-limiting processes may allow a "short-circuiting" of the limiting steps of each. For example, Ag may provide sites for efficient charge transfer, while LSC may provide rapid mass transport. Second, the effective three-phase boundary length in the cermet may be larger due either to a composition-dependent change in electrode morphology or the additional Ag-LSC interfaces in the cermet.

Based on the above results, Ag-perovskite cermets with $f_{Ag}$ in the range of 0.2–0.6 provide high conductivity and low interfacial resistance. Cermets with volume fraction of silver of about 0.3 are preferable because they combine high conductivity with low interface resistance.

This composition was thus tested in initial 200h stability tests in air at 750° C. Based upon prior experience with Ag-YSZ electrodes [5], the tests were conducted on electrodes that were coated with a 1 μm thick, pure porous LSC layer in order to suppress Ag evaporation and segregation. The cap layer was effective in maintaining stable electrode morphology and composition, as indicated by SEM and EDX observations after annealing $r_i$ for 200 h at 750° C. were examined by ERD and showed no evidence of the formation of interfacial phases.

The poor thermal expansion match between these materials and the electrolyte is a potential problem, especially for Ag-LSC. There was no evidence of cracking or delamination of the Ag-perovskite films despite numerous thermal cycles between room temperature and 750° C. This indicates that at a film thickness of 1 μm, the Ag and LSC thermal expansion difference with alumina and YSB substrates was not a major problem. Ag-perovskite films with thickness in the range of 1.5 to 100 μm are useful; however, Ag-perovskite films with thickness in the range of 10.5 to 1.5 μm are preferred, because that range minimizes the cracking problem.

The resistivity of Ag-$(La_{0.7}Sr_{0.3})CoO_3$ cermets decreased as the Ag volume fraction $f_{Ag}$ increased from $\approx 1.6 \times 10^{-2}$ Ω.cm for pure LSC to $\approx 10^{-5}$ Ω.cm for pure Ag at 740° C. The $f_{Ag}=0.3$ cermet had a resistivity factor of $=20$ times less than pure LSC. The cermet electrodes should thus allow either a decrease in electrode resistance, important to reduce ohmic polarization in cell geometries with long current paths, or a decrease in electrode thickness to reduce materials costs. The interfacial resistance $r_i$ of the cermet electrodes with $f_{Ag}=0.3$ on YSB electrolytes was 0.3 Ω.cm$^2$ at 750° C. in air, lower than either pure LSC or pure Ag, and was stable during initial long-term testing. Ag-LSM electrodes also exhibited lower $r_i$ than either pure Ag or pure LSM on YSB electrolytes. These cermet materials thus have desirable properties for medium-temperature SOFC applications; including low resistivity, excellent catalytic performance, and good stability.

Although the cermet material has been described particularly with respect to SOFC's, the cermet is also useful for other solid-state electrochemical devices, e.g., sensors and electrolyzers.

REFERENCES

[1] L. S. Wang and S. A. Barnett, Solid State Ionics 61 (1993) 273.

[2] N. Q. Minh, T. R. Armstrong, J. R. Esopa, J. V. Guiheen, C. R. Home, and J. J. VanAckeren, in: Third Int. Symp. Solid Oxide Fuel Cells, eds. S. C. Singhal and H. Iwahara Electrochem. Soc., Pennington, 1993) p. 801.

[3] S. A. Barnett, Energy 15 (1990) 1.

[4] K. Krist and J. D. Wright, in: Proc. Third Int. Symp. Solid Oxide Fuel Cells, eds. S. C. Singhal and H. Iwahara (Electrochem. Soc., Pennington, 1993) p. 782.

[5] L. S. Wang and S. A. Barnett, J. Electrochem. Soc. 139 (1992) 89.

[6] L. S. Wang and S. A. Barnett, J. Electrochem. Soc. 139 (1992) 1134.

[7] A. Tsunoda, T. Yoshida, and S. Sakurada, in: Proc. First Int. Symp. Solid Oxide Fuel Cells, ed. S. C. Singhal (Electrochem. Soc., Pennington, 1989) p. 204.

[8] E. S. Thiele, L. S. Wang, T. O. Mason, and S. A. Barnett, J. Vac. Sci. Technol. A9 (1991) 3054.

What is claimed:

1. An air electrode for a solid oxide fuel cell, said electrode comprising a thin film consisting essentially of an Ag-Perovskite cermet.

2. An air electrode as in claim 1 wherein the thickness of said cermet film is between 0.5 and 150 μm.

3. An air electrode as in claims 1 or 2 in which the volume fraction of silver, $f_{Ag}$, in said cermet is between 0.2 and 0.6.

4. An air electrode as in claims 1 or 2 in which the volume fraction of silver $f_{Ag}$ in said cermet is about 0.3.

5. An air electrode as in claims 1 or 2 in which said perovskite is $(La_{0.7}Sr_{0.3})CoO_3$.

6. An air electrode as in claims 1 or 2 in which said perovskite is $(La_{0.7}Sr_{0.3})MnO_3$.

7. An air electrode for a solid oxide fuel cell, said electrode comprising a cermet having a composition of a perovskite with a volume fraction of silver between 0.2 and 0.6.

8. An air electrode as in claim 7 in which the volume fraction of silver is about 0.3.

9. An air electrode as in claims 7 or 8 in which the perovskite is $(La_{0.7}Sr_{0.3})CoO_3$.

10. An air electrode as in claim 7 or 8 in which the perovskite is $(La_{0.7}Sr_{0.3})MnO_3$.

11. An air electrode for a solid oxide fuel cell, said electrode comprising a thin film of cermet material having a composition consisting essentially of a perovskite with a volume fraction of silver between 0.2 and 0.6.

12. An air electrode as in claim 11 in which the volume fraction of silver is about 0.3.

13. An air electrode as in claim 11 wherein the thickness of the thin film is between 0.5 and 1.5 μm.

14. An air electrode as in claim 11 wherein the cermet is annealed.

15. An air electrode as in claims 11, 12, 13 or 14 wherein the perovskite is $(La_{0.7}Sr_{0.3})$ $CoO_3$.

16. An air electrode as in claims 11, 12, 13 or 14 wherein the thin film is capped with a perovskite film.

17. An air electrode as in claim 1 wherein the thickness of said ceramic film is between 0.5 and 1.5 μm.

18. An electrode for electrochemical devices comprising a thin film cermet material having a composition consisting essentially of a perovskite with a volume fraction of silver between 0.2 and 0.6.

* * * * *